(No Model.)  2 Sheets—Sheet 1.

W. T. HARVEY.
MACHINE FOR DRESSING STONE.

No. 371,885. Patented Oct. 18, 1887.

WITNESSES:
John E. Morris
Robert L. Clemmitt.

INVENTOR:
Wm T Harvey
BY Chas B. Mann
ATTORNEY.

(No Model.) 2 Sheets—Sheet 2.

W. T. HARVEY.
MACHINE FOR DRESSING STONE.

No. 371,885. Patented Oct. 18, 1887.

WITNESSES:
John E. Morris.
Robert L. Clemmitt.

INVENTOR:
Wm T. Harvey

BY Chas B. Mann
ATTORNEY.

UNITED STATES PATENT OFFICE.

WILLIAM T. HARVEY, OF BALTIMORE, MARYLAND, ASSIGNOR OF ONE-HALF TO ROBERT B. PUMPHREY, OF SAME PLACE.

MACHINE FOR DRESSING STONE.

SPECIFICATION forming part of Letters Patent No. 371,885, dated October 18, 1887.

Application filed May 23, 1887. Serial No. 239,069. (No model.)

*To all whom it may concern:*

Be it known that I, WILLIAM T. HARVEY, a citizen of the United States, residing at Baltimore, in the State of Maryland, have invented certain new and useful Improvements in Machines for Dressing Stones, of which the following is a specification.

This invention relates to a machine for dressing stone, and has for its object to provide a special lathe and tool for turning stone cylinders.

The invention is illustrated in the accompanying drawings, in which—

Figure 1:
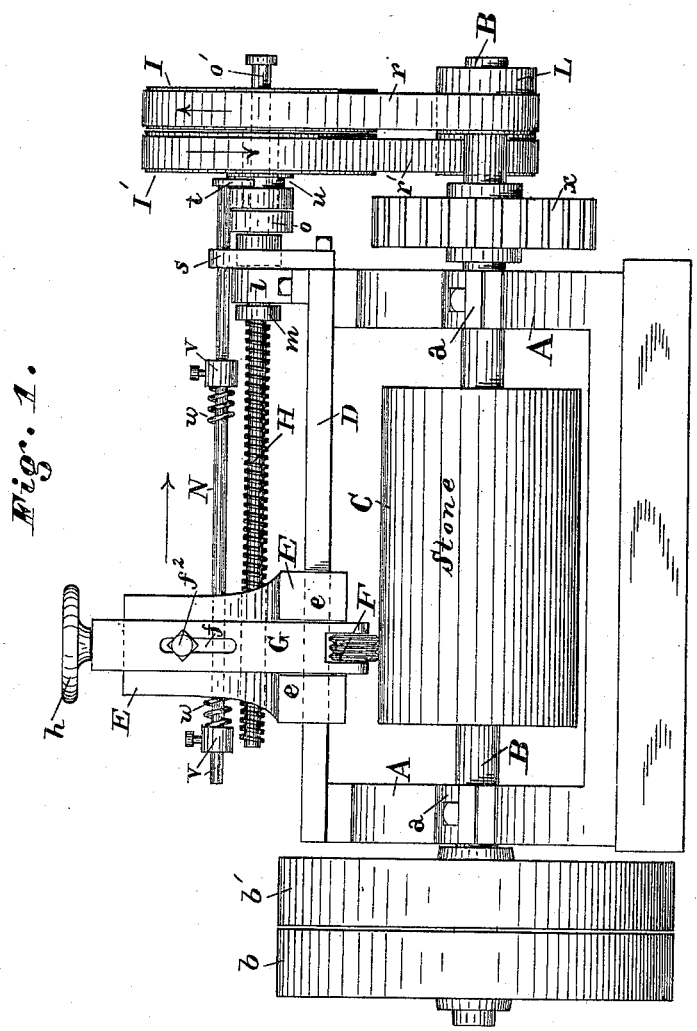
Figure 2:
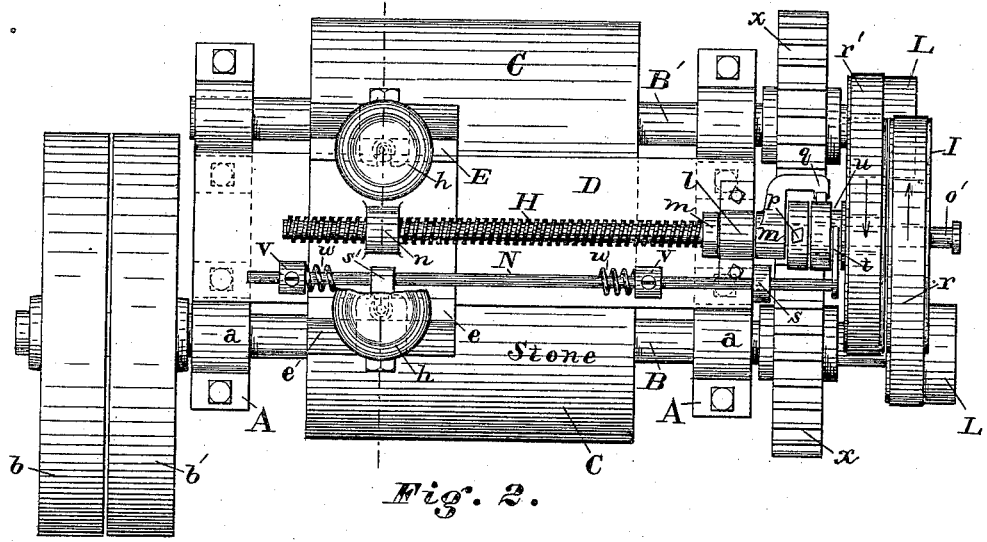
Figure 3:
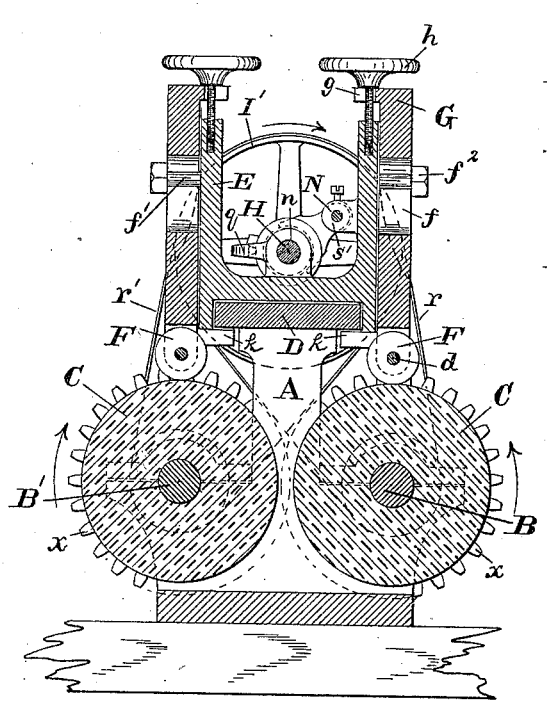
Figures 4, 5:
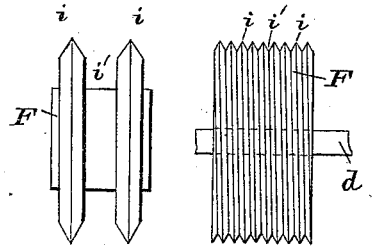
Figure 6:
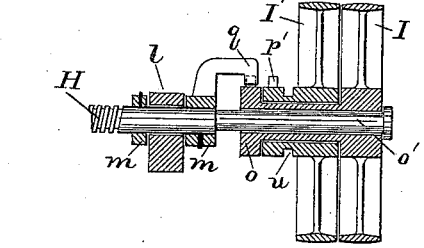

Figure 1 is a side elevation. Fig. 2 is a top view. Fig. 3 is a vertical cross-section of the machine. Figs. 4 and 5 show two views of the cutting-tool. Fig. 6 is a sectional view of the screw-driving mechanism.

The letter A designates the standards or pillows, on which are bearings $a$ for the shaft B, which carries the stone, C, to be dressed. This shaft also carries a loose pulley, $b$, and a drive-pulley, $b'$. A horizontal slide, D, is supported on the standards, and a tool-carriage, E, is movable back and forth on said slide.

The cutting-tool F is circular and has a central hole for a shaft, $d$, whose ends are supported on the tool-holder G, which is attached to the tool-carriage and is adjustable thereon up or down—that is, away from or toward the stone-shaft B.

The tool-holder G is movable up or down between two guide-lugs, $e$, on the carriage, and has a vertical slot, $f$, through which a bolt, $f'$, projects. This bolt is fixed to the carriage and on its end has a nut, $f^2$, which may be tightened against the holder, and thus assist to retain it where set. The upper end of the tool-holder has two lateral prongs, $g$, and a vertical depressing-screw, $h$, at the top of the tool-carriage has position between the said two prongs. By turning down the screw $h$ the tool-holder and cutting-tool F will be forced against the stone.

The circular cutting-tool F is revoluble on its supporting-shaft $d$. The peripheral face of the circular tool has sharp edges $i$, which bear directly against the stone, and annular grooves or spaces $i'$ between the edges. When commencing to cut a rough stone, a tool like that shown in Fig. 4 is used, which may be termed the "jack-cutter." This tool has two sharp edges, $i$, and a wide space or groove, $i'$, between them. After the stone has been dressed or turned down to nearly the desired size, the jack-cutter may be removed and a finishing-cutter inserted, like that shown in Fig. 5. In this tool the sharp edges $i'$ are more numerous and closer together, but not so deep. In the finishing-cutter the sharp edges may be spiral, like a screw-thread, or each edge may be separate and unconnected with any other.

The tool-carriage E and tool F are caused to move back and forth on the horizontal slide D by a screw, H. The base of the carriage E has at each side an inward-projecting lug, $k$, (see Fig. 3,) which takes under the slide D and confines the carriage loosely thereto.

The screw H turns freely in a bearing, $l$, at one end of the machine and has fixed to it at each side of the bearing a collar, $m$, which prevents the screw from moving endwise. The carriage has on top a boss, $n$, tapped and threaded for the screw to pass through. Thus when the screw turns the effect is to cause the tool-carriage to move.

Provision is made for turning the screw H in both directions—that is, turning it first one way to cause the tool-carriage E to move along the slide from one end to the other, and then upon reversing the motion of the screw cause said carriage to move back again to the other end. To effect this the screw carries two drive-pulleys, I I', which revolve in opposite directions, and mechanism is employed to have first one and then the other drive-pulley come into play. The pulley I turns freely on the smooth end of the screw (see Fig. 6) and has a sleeve, $o$, on which the pulley I' turns. This sleeve is also free to slide endwise on the smooth part $o'$ of the screw, and thereby both pulleys may be shifted. The sleeve $o$ is provided with a stud, $p$, and the hub of the pulley I' also has a stud, $p'$. These studs have two inclined sides, though the sides of one stud should incline oppositely from the other. To one of the collars $m$, fixed on the screw, is a dog, $q$, the end of which comes in contact with either one of the studs $p$ or $p'$, according as the pulley I and its sleeve $o$ may be moved away from or toward the said dog $q$. When the stud $p$ is against the dog $q$, as in Fig. 6, the pulley I of this stud cannot turn independent of the screw—that is, cannot turn freely on the smooth part $o'$ of the screw. Consequently this pulley will cause the screw to revolve in the direction it is turning. When the other stud, $p'$, is against the dog $q$, as in Fig. 2, the pulley I' cannot turn independent of the screw. Consequently this pulley will cause the screw to revolve with it in an opposite direction. It will thus be seen the position of the two pulleys I I' on the smooth part $o'$ of the screw determines the direction the screw will turn. If the two pulleys are close against the dog-collar $m$, as in Fig. 1, the pulley I' acts as the driver and the other pulley, I, runs loose. If they are moved away from said dog-collar, as in Fig. 6, the pulley I acts as the driver. A pulley-shifter is employed to slide the two pulleys on the smooth part $o'$.

The shaft B has a pulley, L, over which a belt, $r$, passes to the pulley I, and another belt, $r'$, passes over the other pulley, I'. It is proper to explain here that the machine here shown is built with double stone-shafts B B'. Two stones, C may therefore be dressed at the same time. In this instance, then, each of the two stone-shafts B B' has a pulley L and the belt $r$ passes over the pulley L on the one shaft, B, while the other belt, $r'$, passes over the pulley L on the other shaft, B', and thence over the pulley I' on the screw H. If the machine used one stone-shaft only, the arrangement of the belts $r\ r'$ would necessarily be different. In such case both belts would pass over the one pulley L, and one of said belts would then have to be twisted in a well-known way. The same effect in reversing the motion of the screw would then be produced.

The pulley-shifter comprises a rod, N, which is loose in a slide-bearing, $s$, at the end of the machine and another bearing, $s'$, on the tool-carriage. This rod has at one end an arm, $t$, which is connected with the pulleys by the free end taking or occupying an annular groove, $u$, on the hub of the pulley I'. It will be seen that by moving the shifter-rod N endwise in the bearings $s\ s'$ its arm $u$, which is connected with the two pulleys, as described, will cause the said two pulleys to slide. The shifter-rod N is moved by the action of the moving tool-carriage as follows: The rod has two stop-collars, $v$, each secured by a set-screw. Their position on the rod, therefore, may be changed. A spiral spring, $w$, is around the rod in front of each stop-collar and acts as a spring-cushion.

The tool-carriage E moves along the slide D in either direction, and the rod N passes freely through the bearing $s$ on said tool-carriage. When the said bearing $s'$ comes against either spring-cushion $w$ the effect is, first, to compress the said spring and then push the shifter-rod endwise, which will slide the two pulleys I I' and cause the studs $p\ p'$ to change position with relation to the dog $q$. It will be understood that when the tool-carriage has moved so far in one direction that its bearing $s'$ comes against the spring of a stop-collar the pulleys I I' will be shifted and the motion of the screw H reversed, whereupon the tool-carriage will at once commence moving the other way. The reverse movement of the tool-carriage is therefore automatic.

Reference has been made to the studs $p\ p'$, having inclined sides. The object of this inclination is, that when the dog $q$ comes against the stud the inclination of the side bearing against the dog will tend to retain the pulleys in the position on the smooth part $o'$ they may then be occupying.

Where two stone-shafts B are used they are connected by gear-wheels $x$ on each shaft, so that they turn in opposite directions; hence the two belts $r$ and $r'$, which alternately drive the screw H, travel in opposite directions.

In operating the machine after the stone is set and the machine started it is necessary only to give the tool-holder attention and keep it set down so the tool F will bear down on the stone.

Having described my invention, I claim and desire to secure by Letters Patent of the United States—

1. The combination, with the stone-shaft mounted in suitable bearings, of the traveling tool-carrier, the screw for moving the same, the longitudinally-moving rod operated by said carrier, the shifting pulleys operated by said rod, and the belts connected with the drive-pulleys, whereby the screw is alternately rotated in opposite directions to move the tool-carrier back and forth, substantially as specified.

2. The combination, with the screw H, which moves the tool-holder, of the dog $q$, secured to said screw, the pulleys I I', mounted upon the extended plane end of said screw and arranged to turn in opposite directions, and the studs $p\ p'$ on the collars of the respective pulleys, so arranged relatively that as the pulleys are rotated the screw will be turned alternately in opposite directions to reciprocate the dressing-tool, substantially as specified.

3. The combination, with the shafts B B', carrying the stones to be dressed, and with intermeshing gearing, of the traveling tool-holder, the screw by which it is reciprocated, the shifting-bar N and its spring-bearings W V, the movable pulleys I I', connected with the driving-pulleys by suitable belts, and the engaging dog and studs, whereby the parts are shifted so as to cause the tool-holder to travel back and forth over the stone, substantially as specified.

In testimony whereof I affix my signature in the presence of two witnesses.

WILLIAM T. HARVEY.

Witnesses:
JOHN E. MORRIS,
JNO. T. MADDOX.